United States Patent [19]

Duffield

[11] Patent Number: 5,363,143
[45] Date of Patent: Nov. 8, 1994

[54] SIDE BY SIDE PICTURE DISPLAY WITH REDUCED CROPPING

[75] Inventor: David J. Duffield, Indianapolis, Ind.

[73] Assignee: Thomson Consumer Electronics, Inc., Indianapolis, Ind.

[21] Appl. No.: 194,776

[22] Filed: Feb. 10, 1994

Related U.S. Application Data

[63] Continuation of Ser. No. 115,608, Sep. 3, 1993, abandoned.

[51] Int. Cl.⁵ .............................................. H04N 5/262
[52] U.S. Cl. .................................... 348/564; 348/588; 348/704
[58] Field of Search ............... 348/564, 581, 588, 704, 348/913, 445; 358/183, 230; H04N 5/262

[56] References Cited

U.S. PATENT DOCUMENTS 4,897,722  1/1990  Flory .................................... 358/180
5,023,720  6/1991  Jardins ................................. 358/183

FOREIGN PATENT DOCUMENTS 4300043  7/1993  Germany ........................ H04N 5/45

Primary Examiner—Victor R. Kostak
Attorney, Agent, or Firm—Joseph S. Tripoli; Joseph J. Laks; Harvey D. Fried

[57] ABSTRACT

A wide screen television apparatus comprises a video display having a first vertical display height and a first format display ratio. A first video processor combines video signals representative of at least two pictures for side by side display of the pictures on the video display, each of the pictures having a second format display ratio smaller than approximately 4:3. A vertical height control decreases the vertical display height smaller than the first vertical display height during the side by side display of said pictures, each of the side by side pictures thereby having a third format display between the first and second format display ratios. The first, or a second, video processor horizontally compresses each of the pictures to correct for any image aspect ratio distortion due to decreasing the vertical deflection height. In an illustrated embodiment, the first format display ratio is about 16:9, the second format display ratio is about 8:9 and the third format display ratio is about 8:7.

16 Claims, 3 Drawing Sheets

SIDE BY SIDE PICTURE DISPLAY WITH REDUCED CROPPING

This is a continuation of application Ser. No. 115,608, filed Sept. 3, 1993, now abandoned.

BACKGROUND OF THE INVENTION

The invention relates to simultaneous multiple picture displays, and in particular concerns an improved display format for two side by side pictures on a wide screen television, with correct image aspect ratio and without substantial cropping.

In the following discussion, the terminology "format display ratio" refers to the ratio of the width to height of the borders of a picture or display means. The format display ratio of the video to display means for a conventional television apparatus, for example, is 4:3. Such numerical ratios are also expressed as 4×3, and both formats for expressing ratios may be used herein. The terminology "image aspect ratio" refers to the ratio of the width to the height of images constituting a picture, without regard to the borders or dimensions of the overall picture. Images constituting a picture will have a correct image aspect ratio if such pictures are not distorted by disproportionate compression or expansion of horizontal and vertical dimensions. This distinction is important because two pictures can have the same format display ratio, but different image aspect ratios, and vice versa.

International Application No. PCT/US91/03742, corresponding to International Publication No. WO 91/19395, discloses a wide screen television apparatus for processing multiple video signals to generate a plurality of multiple picture display formats, including among others, two side by side pictures, each of which fills ½ of the area of the wide screen video display means. The format display ratio of the video display means for the wide screen television apparatus disclosed in PCT/US91/03742 is 16:9, also expressed as 16×9.

Side by side pictures are an appealing feature for a television apparatus, especially one having a wide screen display. One can watch two programs simultaneously, with equal size pictures. This can be significantly more pleasing than a picture-in picture format, wherein a second picture overlays a main picture, and is quite small in display area by comparison to the main picture. Side by side displays provide two main pictures. However, side by side picture display formats can present a problem, even on a wide screen display, because significant amounts of subject matter must be cropped in order to avoid image aspect ratio distortion. If a wide screen television has such video display means with a format display ratio of approximately 16:9, for example, each of the side by side pictures displayed thereon will have a format display ratio of approximately 8:9. If the picture sources have a conventional format display ratio of 4:3, then each of the pictures must have approximately 33% of its subject matter cropped, horizontally, if the resulting pictures, as displayed, are to have no image aspect ratio distortion.

An alternative to cropping is compressing the pictures horizontally, thereby incurring image aspect ratio distortion of the pictures. This is generally unacceptable at levels which would be is necessary to substantially reduce cropping. A compression as little as 1.05 or 1.1 to 1 can be noticeable under some circumstances. Further compression can be very annoying. A compression of 30% to 50%, for example, is so severe that the two pictures cannot practically be viewed for more than a brief time. Such compression might be suffered for a sufficient time to determine what subject matter is appearing on an alternate channel, however, such compression is too severe to enable comfortable viewing of both pictures. The advantage of having the two simultaneous pictures may be outweighed by the sacrifices in cropping or image aspect ratio distortion which are made in order to display side by side pictures.

SUMMARY OF THE INVENTION

This invention provides a new display format for side by side pictures which can substantially reduce the need for picture cropping without incurring image aspect ratio distortion; or if some small measure of image aspect ratio distortion can be tolerated, substantially avoids the need for any picture cropping. In accordance with the invention, the nominal vertical picture height is reduced. Reducing the vertical picture height is seemingly contrary to the advantages of a wide screen television, which provides a large viewing area, and which in many cases enables video sources in letterbox 4:3 format to be displayed in an enlarged size, with the black bars eliminated from view. In fact, the area of each side by side picture will be reduced. However, this reduction in vertical display height effectively increases the format display ratio of each side by side picture, so that much less cropping is necessary to avoid image aspect ratio distortion.

In accordance with the example set forth above, wherein a wide screen television has a format display ratio of 16:9, each of two side by side pictures would have format display ratios of 8:9. Each picture must be cropped horizontally by approximately 33% to avoid image aspect ratio distortion. If the vertical picture height is reduced by only 2/9, the format display ratio of each picture will increase from 8:9 to 8:7, which is approximately 28%. The pictures are smaller, but not so much smaller as to be objectionable. Moreover, the amount of subject matter cropping needed to avoid image aspect ratio distortion is then only approximately 14%. Implementing a display mode which is contrary to the general advantages of a wide screen television can therefore provide an improved display format for side by side pictures. Cropping can be substantially eliminated if the resulting pictures are horizontally compressed by only approximately 14%, resulting in image aspect ratio distortion which many viewers may not find objectionable, in view of the fact that both pictures are complete in subject matter.

Decreasing the vertical deflection height has the effect of vertically compressing the picture and incurring image aspect ratio distortion. Accordingly, it is necessary to horizontally compress the pictures by the same proportion as the vertical height reduction. This has the effect of restoring the proper image aspect ratio, and at the same time, also has the effect of decreasing the amount of the picture which is horizontally cropped. In other words, more of the subject matter of the picture must be fit into the vertically reduced 8:7 format display border than into the 8:9 format display border to prevent image aspect ratio distortion. Fitting in more subject matter is equivalent to reducing the amount of cropping.

A television apparatus in accordance with this invention comprises: video display means having a first vertical display height and a first format display ratio greater than approximately 4:3; means for combining video signals representative of at least two pictures for side by side display of the pictures on the video display means, each of the pictures having a second format display ratio smaller than approximately 4:3; means for decreasing the vertical display height smaller than the first vertical display height during the side by side display of the pictures, each of the side by side pictures thereby having a third format display between the first and second format display ratios; and, means for horizontally compressing each of the pictures to compensate for any image aspect ratio distortion incurred by decreasing said vertical display height. The first format display ratio is approximately 16:9, the second format display ratio is approximately 8:9 and the third format display ratio is approximately 8:7. The vertical display height is decreased by a certain factor and the pictures are horizontally compressed by the same certain factor. Alternatively, the vertical display height is decreased by a first factor and the pictures are horizontally compressed by a second factor larger than the first factor to further reduce cropping of the pictures notwithstanding some image aspect ratio distortion.

The invention can also be described in terms of cropping, wherein a television apparatus comprises: video display means having a first vertical display height and a wide format display ratio; video processing means for combining video signals representative of at least two pictures for side by side display of the pictures on the video display means, each of the side by side pictures filling a given area of the video display means and having a certain portion of subject matter cropped therefrom; means for decreasing the vertical display height smaller than the first vertical display height during the side by side display of the pictures, each of the side by side pictures thereby filling an area of the video display means smaller than the given area but having a smaller portion than the certain portion cropped therefrom; and, means for horizontally compressing each of the pictures to compensate for any image aspect ratio distortion incurred by decreasing said vertical display height. The vertical display height is decreased by a certain factor and the pictures are horizontally compressed by the same certain factor. Alternatively, the vertical display height is decreased by a first factor and the pictures are horizontally compressed by a second factor larger than the first factor to further reduce cropping of the pictures notwithstanding some image aspect ratio distortion.

DETAILED DESCRIPTION OF THE PREFERRED EMBODIMENTS

Figure 1:
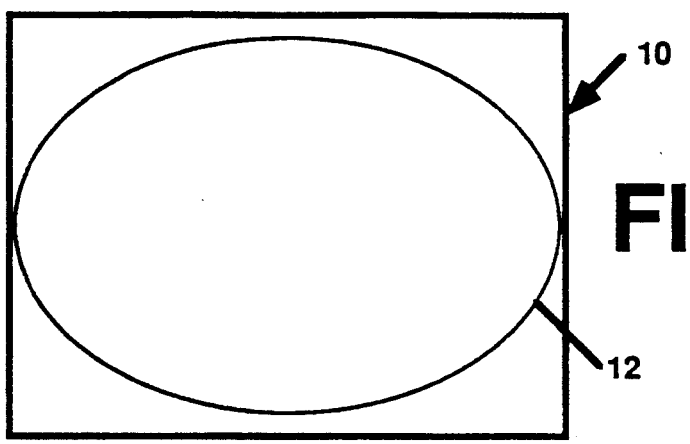
FIG. 1 is a diagram of a video display screen having a format display ratio of 4×3, on which a geometric oval form is displayed without image aspect ratio distortion.
Figure 2:
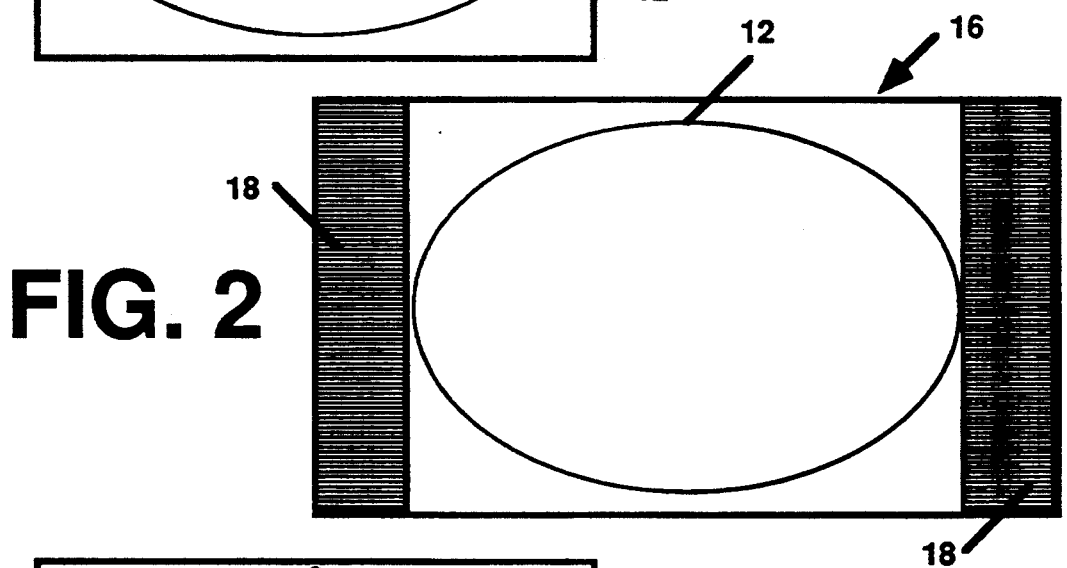
FIG. 2 is a diagram of a video display screen having a format display ratio of 16×9, on which the geometric oval form as in FIG. 1 is displayed as a 4×3 picture on part of the screen and without image aspect ratio distortion.
Figure 3:
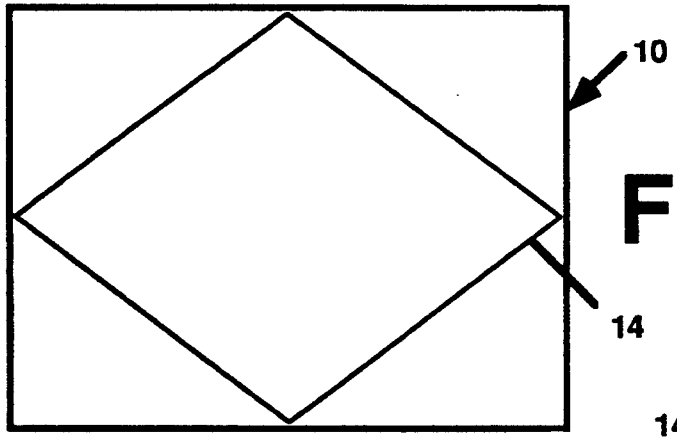
FIG. 3 is a diagram of a video display screen having a format display ratio of 4×3, on which the geometric diamond form is displayed without image aspect ratio distortion.

FIGS. 1 and 3 are diagrams of a video display screen 10 having a format display ratio of 4×3, on which a geometric oval form 12 and a geometric diamond form 14 are respectively displayed, each without image aspect ratio distortion. Such 4×3 pictures can be displayed on the video display screen 16 of a wide screen television apparatus 70, described in connection with FIG. 8, in a variety of display formats, including those shown in FIGS. 2 and 4. The wide screen display 16 may be formed by a direct view cathode ray tube, a projection cathode ray tube or a flat panel display, such as a liquid crystal matrix. The invention is not limited to the nature of a particular display apparatus.

Figure 4:
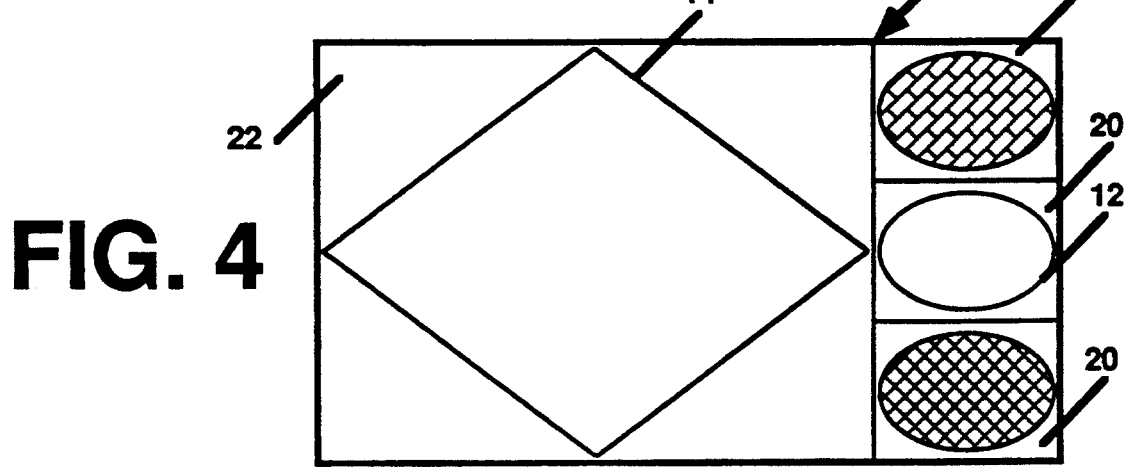
FIG. 4 is a diagram of a video display screen having a format display ratio of 16×9, on which the geometric diamond form is displayed as a 4×3 main picture and three different geometric oval forms are displayed in picture-outside-picture (POP) format, all four pictures being displayed as 4×3 pictures and without image aspect ratio distortion.

The display format illustrated on video display screen 16 in FIG. 2 shows the 4×3 picture of oval 12 centered on the 16×9 wide screen display, with dark vertical bars 18 on each side. The picture retains the 4×3 format display ratio. Image aspect ratio distortion can be avoided by speeding up the video signal in a memory, wherein digitized video data is read out of the memory at a faster rate than the digitized data is written into the memory. There is not enough data to fill the wide screen display horizontally, which accounts for the dark bars 18. The picture can be horizontally positioned, for example by delaying the start of reading each line. If the picture is positioned to one side of the display 16, as shown in FIG. 4, there is enough room for three POP's 20, illustrated as three variations of the geometric oval 12. The larger geometric diamond 14 becomes the main picture 22. All four pictures retain the 4×3 format display ratio and have no image aspect ratio distortion. However, the video signals for the smaller pictures 20 are often subsampled and/or interpolated to provide smaller pictures for display during the same horizontal scans that are used when displaying the main or larger picture 22. This results in a loss of resolution, in addition to the much smaller size. Some or all of the smaller pictures 20 are sometimes updated, or refreshed, less frequently, than the main picture. Accordingly, the auxiliary pictures are not generally intended for extended viewing, but for monitoring the auxiliary channels to determine when to interchange or switch the sources and have one of the auxiliary sources become the main source.

Figure 5:
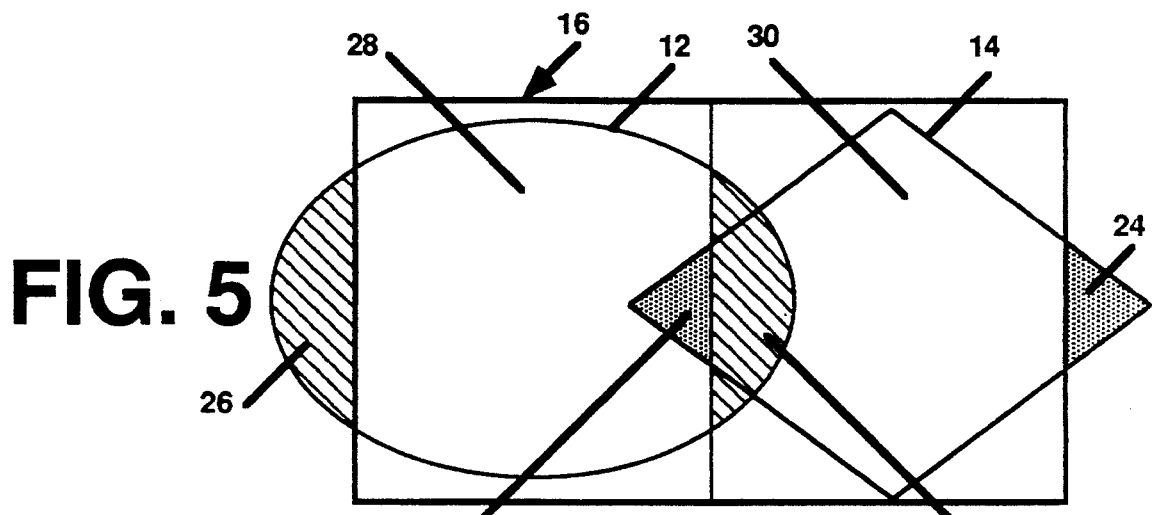
FIG. 5 is a diagram of a video display screen having a format display ratio of 16×9, illustrating subject matter cropping in each of two side by side 8×9 pictures displayed without image aspect ratio distortion.

In view of these limitations of multiple picture displays under some circumstances, the ability to display two main pictures 28 and 30 in a side by side format on a wide screen television, as shown in FIG. 5, is a particular advantage. The wide screen display 16 in FIG. 5 shows the oval and diamond geometric forms 12 and 14 as they would appear in a side by side display. As explained in the Background of the Invention, the side by side pictures 28 and 30 cannot fill the full, or nominal, vertical height without severe image aspect ratio distortion or substantial cropping. FIG. 5 illustrates the substantial horizontal cropping, approximately 33%, by the stippled areas 24 of the diamond form 14 and the cross-hatched areas 26 of the oval form 12. It can be appreciated, for example, that if the subject matter of one of the pictures concerns two people speaking to one another from opposite sides of a room, that both people could be cropped from the picture. A viewer might very well be presented with a disembodied conversation in an apparently empty room. Substantial horizontal compression can be implemented, but this is generally considered less desirable than cropping, and is not illustrated.

Figure 6:
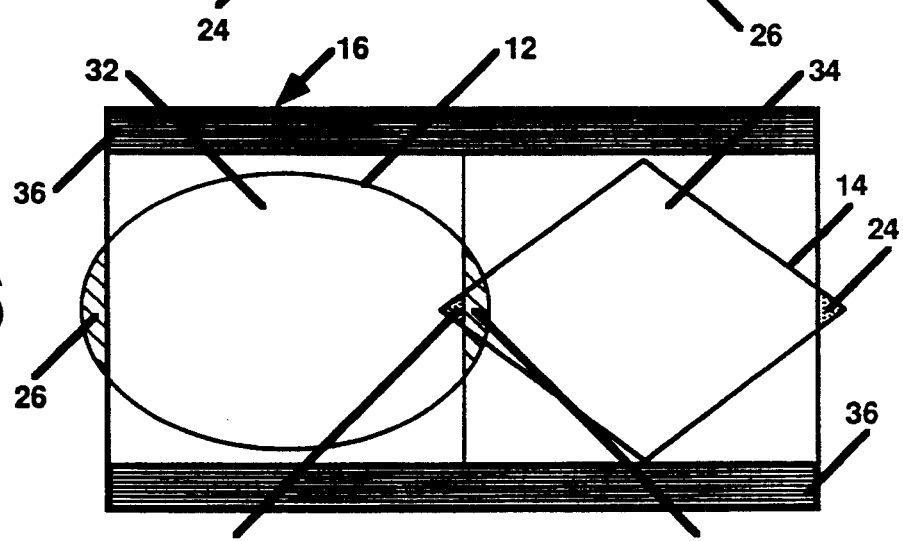
FIG. 6 illustrates the effect on the video display of FIG. 5 when the vertical deflection height is decreased in accordance with the invention and the format display ratio of each of the side by side pictures in FIG. 5 is increased to reduce cropping of each picture without incurring image aspect ratio distortion.

The side by side display can be significantly improved in accordance with the invention as shown in FIG. 6, by reducing the vertical picture height. This forms two shorter side by side pictures 32 and 34, bordered top and bottom by horizontal dark bars 36. It can be easily seen that much less subject matter is cropped from the pictures. Even though the pictures 32 and 34 are smaller in area than pictures 28 and 30, much more subject matter of each video source is displayed. Under many circumstances, the reduction in vertical height is sufficient to improve the side by side picture display. As noted above, decreasing the vertical deflection height has the effect of vertically compressing the picture and incurring image aspect ratio distortion. Accordingly, the same video signal processor, or another video signal processor, must be utilized to horizontally compress the pictures by the same proportion as the vertical height reduction. Such a video processor can include an asynchronous line memory and an interpolator. The vertical display s height is decreased by a certain factor and the pictures are horizontally compressed by the same certain factor. This has the effect of restoring the proper image aspect ratio, and at the same time, also has the effect of decreasing the amount of the picture which is horizontally cropped. In other words, more of the subject matter of the picture must be fit into the vertically reduced 8:7 format display border, than into the 8:9 format display border, to prevent image aspect ratio distortion. Fitting in more subject matter is equivalent to reducing the amount of cropping. Alternatively, the vertical display height can be decreased by a first factor and the pictures can be horizontally compressed by a second factor, larger than the first factor, to further reduce cropping of the pictures, notwithstanding some image aspect ratio distortion.

The reduction in cropping can be appreciated by reference to the dimensions of a 16:9 wide screen display and assuming a diagonal measurement of 34" (approximately 86 cm.), often referred to as 34W, as is the case with many wide screen direct view television apparatus now on the market. Such a screen has a horizontal dimension of approximately 30 inches (approximately 76 cm.) and a vertical dimension of approximately 17 inches (approximately 43 cm.). In a side by side display as shown in FIG. 5, each picture 28 and 30 has a format display ratio of 8:9. Each picture fills ½ of the screen, having a horizontal dimension of approximately 15 inches (approximately 38 cm.) and the same vertical dimension as the video display, approximately 17 inches (approximately 43 cm.). Approximately 33% of each picture is cropped to avoid image aspect ratio distortion. In FIG. 6, the vertical display height is reduced to approximately 7/9 (approximately 78%) of the nominal vertical display height. The format display ratio of each picture 32 and 34 is 8:7, which is wider than 8:9. Each picture 32 and 34 fills less than ½ of the screen, having the same horizontal dimension as in FIG. 5, approximately 15 inches (approximately 38 cm.), but a vertical dimension slightly more than approximately 13 inches (approximately 33 cm.). In this format, only approximately 14% of the subject matter of each video source must be cropped to avoid image aspect ratio distortion, as a result of the horizontal compression undertaken to restore the correct image aspect ratio.

Figure 7:
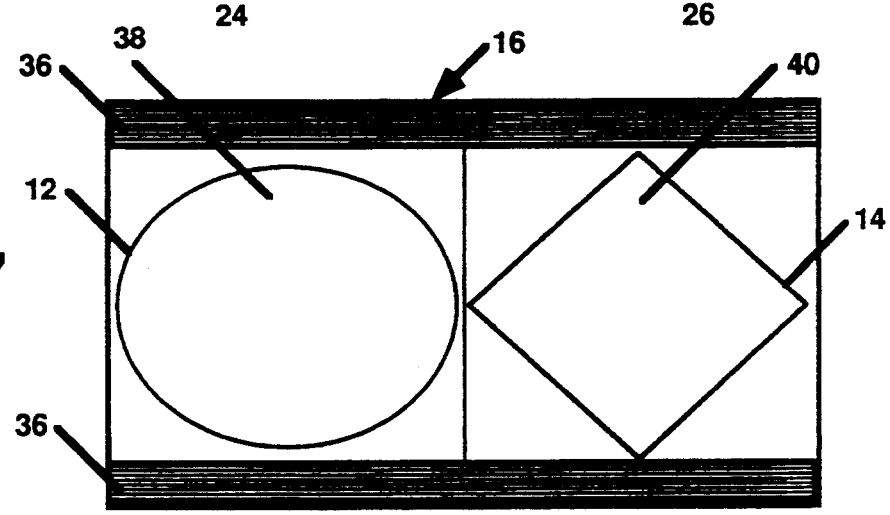
FIG. 7 illustrates the effect on the video display of FIG. 6 when each of the pictures is compressed horizontally to eliminate cropping of the pictures while incurring minimal image aspect ratio distortion.

Side by side pictures 38 and 40 in FIG. 7 illustrate the effect on the pictures 32 and 34 due to use of a vertical height of 78% of the 16:9 screen, accompanied by horizontal compression in to excess of that required to compensate for image aspect ratio distortion due to decreasing the vertical display height of the pictures, to further reduce cropping. Side by side pictures 38 and 40 show a further compression of approximately 14%, which substantially avoids all cropping. Less additional compression in s the range of 0% to approximately 14% requires further cropping in the range of approximately 14% to 0%, but incurs less image aspect ratio distortion. A small amount of additional horizontal compression, for example approximately 4%, is enough to reduce cropping to approximately 10%. Additional horizontal compression of approximately 4% results in barely noticeable image aspect ratio distortion under most circumstances, and cropping of approximately 10% is also barely noticeable under most circumstances. The compromise in having different relative amounts of cropping and image aspect ratio distortion can be viewer controlled, for example in a number of incremental steps.

Figure 8:
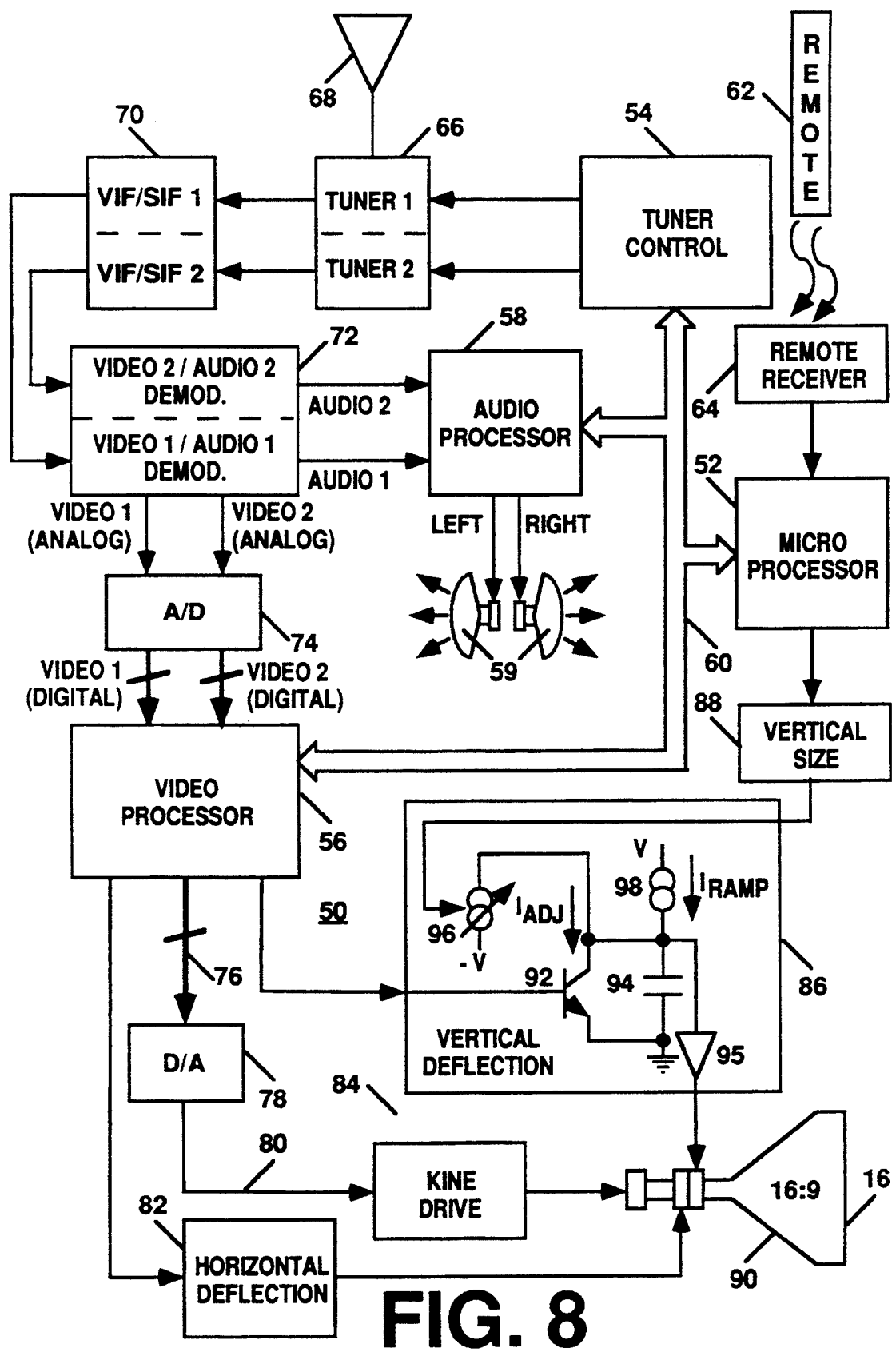
FIG. 8 is a schematic block diagram of a wide screen television apparatus for implementing the display formats shown in FIGS. 2 and 4–7.

FIG. 8 is a block diagram showing those elements of a television apparatus 50 which can be used to implement side by side picture display formats according to the invention The television apparatus 52 is controlled by a microprocessor 52, which communicates with a tuner control 54, a video processor 56 and an audio processor 58 through a control and data bus 60. The audio processor controls sound outputs, exemplified by left and right stereo speakers 59. The audio processor also controls switching with respect to which of the two side by side pictures will have its sound audible at a given time. The other picture, for example, might have its sound available at an external jack. The microprocessor 52 is subject to viewer commands, for example generated by remote control unit 62, the output of which is sensed by remote control receiver 64.

A dual tuner circuit 66, responsive to signals captured by antenna 68, or other signal sources, not shown, is responsive to tuner control 54. A VIF/SIF stage 70 and a video/audio demodulator stage for each of the tuners are also provided. First and second video signals in analog form are inputs to an analog to digital converter 74. First and second digitized video signals are inputs to the video processor 56. The video processor utilizes digital signal processing techniques to generate a video output signal which has subject matter from each of the sources in side by side format. The video processor also decodes and regenerates horizontal and vertical synchronizing signals, as well as generating reset and blanking signals. These signals are supplied to a horizontal deflection circuit 82 and a vertical deflection circuit 86, as well as to the microprocessor. The deflection system is synchronized with the first video signal. In this regard, the designations of the video signals as first and second is arbitrary. In accordance with published techniques, the second video signal can be stored on a field by field or frame by frame basis in order to be synchronized with the first video signal, usually in a video memory.

Horizontal compression and expansion can be accomplished by utilizing line memories, wherein data is written in and read out at different rates. The interpolator smooths data which has been compressed in the line memory and presmooths data which is to be expanded in the line memory. This process is controlled by the microprocessor. Vertical expansion and compression can be accomplished by changing the vertical deflection height, for example by changing the slope of the vertical deflection current. A vertical size control circuit 88 is responsive to the microprocessor, and generates control signals for the vertical deflection circuit 86, which determine or select the slope of the vertical deflection current. The change in slope will be proportional to the desired change in vertical deflection height. This can be implemented in an analog or digital fashion.

The vertical deflection circuit 86 enables adjustment of the vertical size of the raster, in accordance with desired amounts of vertical overscan and underscan, relative to the nominal vertical display height, as necessary for implementing different display formats. As illustrated diagrammatically, a constant current source 98 provides a constant quantity of current $I_{RAMP}$ which charges a vertical ramp capacitor 94. A transistor 92 is coupled in parallel with the vertical ramp capacitor, and periodically discharges the capacitor responsive to the vertical reset signal. In the absence of any adjustment, current $I_{RAMP}$ provides the maximum available vertical size for the raster. To the extent that less vertical raster size is required, an adjustable current source 96 diverts a variable amount of current $I_{ADJ}$ from $I_{RAMP}$, so that vertical ramp capacitor 94 charges more slowly and to a smaller peak value. Variable current source 96 is responsive to a vertical size control signal, for example in analog form, generated by the vertical size control circuit 88. Such vertical size adjustment is independent of a manual vertical size adjustment, not shown. Vertical compression and expansion can also be implemented by signal processing techniques, which are not shown.

The video processor generates a digital output signal 76, which includes side by side pictures. The relative amounts of horizontal compression and/or cropping will depend upon the display format and the vertical display height, responsive to the microprocessor, which is in turn responsive to user commands. The digital output signal 76 is converted to an analog output signal 80 by a digital to analog converter 78. Analog output signal 80 in an input to kine drive circuit 84, which drives a cathode ray tube 90. Horizontal and vertical deflection yokes on the cathode ray tube are coupled to horizontal and vertical deflection circuits respectively. The cathode ray tube 90 has a display screen 16, as in FIGS. 2 and 4–7, with a wide format display ratio of 16:9.

What is claimed is:
1. A television apparatus, comprising:
video display means having a first vertical display height and a first format display ratio greater than approximately 4:3;
means for combining video signals representative of at least two pictures for side by side display of said pictures on said video display means, each of said pictures having a second format display ratio smaller than approximately 4:3; and,
means for decreasing said vertical display height smaller than said first vertical display height during said side by side display of said pictures, each of said side by side pictures thereby having a third format display ratio between said first and second format display ratios.
2. The television apparatus of claim 1, further comprising means for horizontally compressing each of said pictures to compensate for any image aspect ratio distortion incurred by decreasing said vertical display height.
3. The television apparatus of claim 1, wherein said first format display ratio is approximately 16:9 and said second format display ratio is approximately 8:9.
4. The television apparatus of claim 3, wherein said third format display ratio is approximately 8:7.
5. The television apparatus of claim 1, wherein said vertical display height is decreased by a certain factor and said pictures are horizontally compressed by said same certain factor.
6. The television apparatus of claim 1, wherein said vertical display height is decreased by a first factor and said pictures are horizontally compressed by a second factor larger than said first factor to further reduce cropping of said pictures notwithstanding some image aspect ratio distortion.
7. A television apparatus, comprising:
video display means having a first vertical display height and a wide format display ratio;
means for cropping a certain portion of subject matter from video signals representative of at least two pictures and for combining said video signals for side by side display of said cropped pictures on said video display means, said side by side pictures filling a given area of said video display means; and,
means for decreasing said vertical display height smaller than said first vertical display height during said side by side display of said pictures, said side by side pictures thereby filling an area of said video display means smaller than said given area but having a smaller portion than said certain portion cropped therefrom.
8. The television apparatus of claim 7, further comprising means for horizontally compressing each of said pictures to compensate for any image aspect ratio distortion incurred by decreasing said vertical display height.
9. The television apparatus of claim 7, wherein said wide format display ratio is approximately 16:9, and at said first vertical display height, each of said pictures fills approximately ½ of said video display means and approximately 33% of the subject matter of each picture is cropped.
10. The television apparatus of claim 8, wherein when said vertical display height is decreased to approximately 7/9 of said first vertical display height, each of said pictures fills only approximately 7/18 of said video display means but only approximately 14% of the subject matter of each picture is cropped.

11. The television apparatus of claim 7, wherein said vertical display height is decreased by a certain factor and said pictures are horizontally compressed by said same certain factor.

12. The television apparatus of claim 7, wherein said vertical display height is decreased by a first factor and said pictures are horizontally compressed by a second factor larger than said first factor to further reduce cropping of said pictures notwithstanding some image aspect ratio distortion.

13. A television apparatus, comprising:
video display means having a first vertical display height and a first format display ratio;
means for combining video signals representative to two pictures for side by side display of said pictures on said video display means, each of said pictures having a second format display ratio smaller than said first format display ratio; and,
means for decreasing said vertical display height smaller than said first vertical display height during said side by side display of said pictures, thereby imparting to each of side by side pictures a third format display ratio between said first and second format display ratios.

14. The television apparatus of claim 13, further comprising means for horizontally compressing each of said pictures to compensate for any image aspect ratio distortion incurred by decreasing said vertical display height.

15. The television apparatus of claim 13, wherein said first format display ratio is approximately 16:9, said second format display ratio is approximately 8:9 and said third format display ratio is approximately 8:7.

16. The television apparatus of claim 13, wherein said vertical display height is decreased by a certain factor and said pictures are horizontally compressed at least by said same certain factor.

* * * * *